United States Patent [19]

Sato

[11] Patent Number: 5,257,154
[45] Date of Patent: Oct. 26, 1993

[54] RECORDING MEDIUM DISK WITH CLEARANCE FOR ADHESIVE BOND

[75] Inventor: Mitsuyoshi Sato, Miyagi, Japan

[73] Assignee: Sony Corporation, Tokyo, Japan

[21] Appl. No.: 897,588

[22] Filed: Jun. 11, 1992

Related U.S. Application Data

[63] Continuation of Ser. No. 543,662, Jun. 25, 1990, abandoned.

[30] Foreign Application Priority Data

Jun. 23, 1989 [JP] Japan .................. 1-74004[U]

[51] Int. Cl.[5] ............................................. G11B 5/82
[52] U.S. Cl. .................................................. 360/135
[58] Field of Search ............................ 360/135, 133

[56] References Cited

U.S. PATENT DOCUMENTS 4,812,939  3/1989  Oishi ................................. 360/135
4,963,209  10/1990  Chernega ...................... 360/135 X Primary Examiner—A. J. Heinz
Attorney, Agent, or Firm—Lewis H. Eslinger; Jay H. Maioli

[57] ABSTRACT

A disk is provided with discontinuity between a surface of a circumferential portion of a disk base defining a plane for installing a recording medium sheet and a bonding surface provided outside of the aforementioned surface for installation. The discontinuity serves for maintaining the recording medium sheet away from the bonding surface. With this discontinuity, the recording medium sheet can slip smoothly over the surface of the bond. Therefore, removing or scraping off the bond from the bonding surface is avoided.

3 Claims, 2 Drawing Sheets

RECORDING MEDIUM DISK WITH CLEARANCE FOR ADHESIVE BOND

This is a continuation of application Ser. No. 07/543,662, filed Jun. 25, 1990 now abandoned.

BACKGROUND OF THE INVENTION

1. Field of the Invention

The present invention relates generally to a disk for recording information. More specifically, the invention relates to a disk with a recording medium sheet attached on a disk base. Further particularly, the invention relates to a structure of bonding the recording medium sheet onto a disk base.

2. Description of the Background Art

A conventional disk of this type has been disclosed in U.S. Pat. No. 4,631,609, issued on Nov. 18, 1986. The prior proposed disk comprises an essentially disk-shaped or thin dish-shaped disk base having a center hub. The disk base has a circumferential edge section axially offset from the general surface of disk base for defining therebetween an annular groove. The inner edge portion of the circumferential edge section is oriented on the plane to locate a recording medium sheet. From this inner edge portion, is extend a tapered surface. The tapered surface serves as bonding surface for bonding the recording medium sheet onto the disk base with a predetermined magnitude of radial tension so that the recording medium sheet can be stretched over the annular groove between the center hub and the inner edge portion of the circumferential edge section.

In manufacture, the recording medium sheet is carried by a device or machine adapting to provide the predetermined radial tension. Bond is applied to the tapered surface for bonding the circumferential portion of the recording medium sheet thereonto. After bonding, the circumferential edge portion extending from the outer circumference of the disk base is cut and removed.

During the aforementioned process for manufacturing, the recording medium sheet can slidingly move on the bonding surface, thereby rupturing the bound. As a result, bonding force at various circumferential positions of the recording medium sheet becomes uneven. In the worse case, part of the recording medium sheet can be peeled off at a portion where the most bond is removed by the recording medium sheet slipping thereon. Since the radial tension force is applied in radially outward direction, the bond removed from the bonding surface can be accumulated essentially along the outer circumference of the disk base. Such accumulated bond tends to cause difficulty in cutting off the extra portion extending out of the circumference of the disk base.

For preventing this, the aforementioned prior proposal forms a groove at the intersection between the surface defining the plate for installing the recording medium sheet and the bonding surface. The groove is intended to maintain the recording medium sheet oriented at the corresponding portion away from the surface of the disk base so that the recording medium sheet can on the bond on the bonding surface for eliminating or at least reducing bond scrape from the bonding surface. However, in the prior proposal the bonding surface has essentially the same gradient as the sheet installing surface. The bond on the bonding surface may be placed above a plane on which the installing surface and the bonding surface lie. Therefore, the recording medium sheet still serves for scraping the bonding from the bonding surface.

SUMMARY OF THE INVENTION

Therefore, it is an object of the present invention to provide a disk which can resolve the problem encountered in the prior art.

Another object of the invention is to provide a disk which can provide sufficient bonding strength for successfully preventing partial peeling off of a recording medium disk from a disk base.

In order to accomplish the aforementioned and other objects, a disk, according to the present invention, is provided with a discontinuity between a surface of a circumferential portion of a disk base defining a plane for installing a recording medium sheet and a bonding surface provided outside of the aforementioned surface for installation. The discontinuity serves for maintaining the recording medium sheet slipping on the circumferential portion, away from the mating surface. With this discontinuity, the recording medium sheet as slipping ride on the surface of the bond smoothly. Therefore, removing or scraping off the bond from the bonding surface cannot occur.

According to one aspect of the invention, a disk comprises:

a recording medium sheet;

a disk base having a center portion including a center hub and a circumferential portion extending substantially along the outer periphery of the disk base, at least one of the center portion and the circumferential portion defining a first plan which lies on a plan to dispose thereon the recording medium sheet and a second surface on which the corresponding portion of the recording medium sheet is bonded with a predetermined magnitude of radial tension, means, associated with one of the center portion and the circumferential portion for defining a clearance between the second surface and the corresponding portion of the recording medium sheet for maintaining bond for bonding the corresponding portion of the recording medium sheet onto the second surface.

The clearance defining means may comprise one side edge of the second means oriented out of plan on which the corresponding portion of the recording medium sheet lies. The clearance defining means may comprise a groove formed on the second surface.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
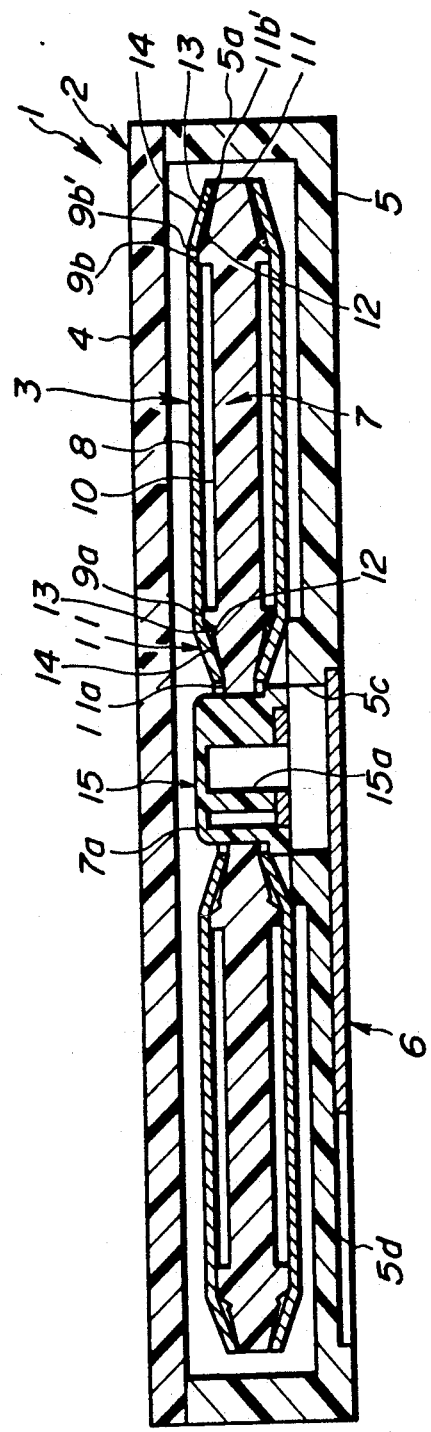
FIG. 1 is a cross section of a disk cartridge housing therein the preferred embodiment of a disk according to the present invention.
Figure 3:
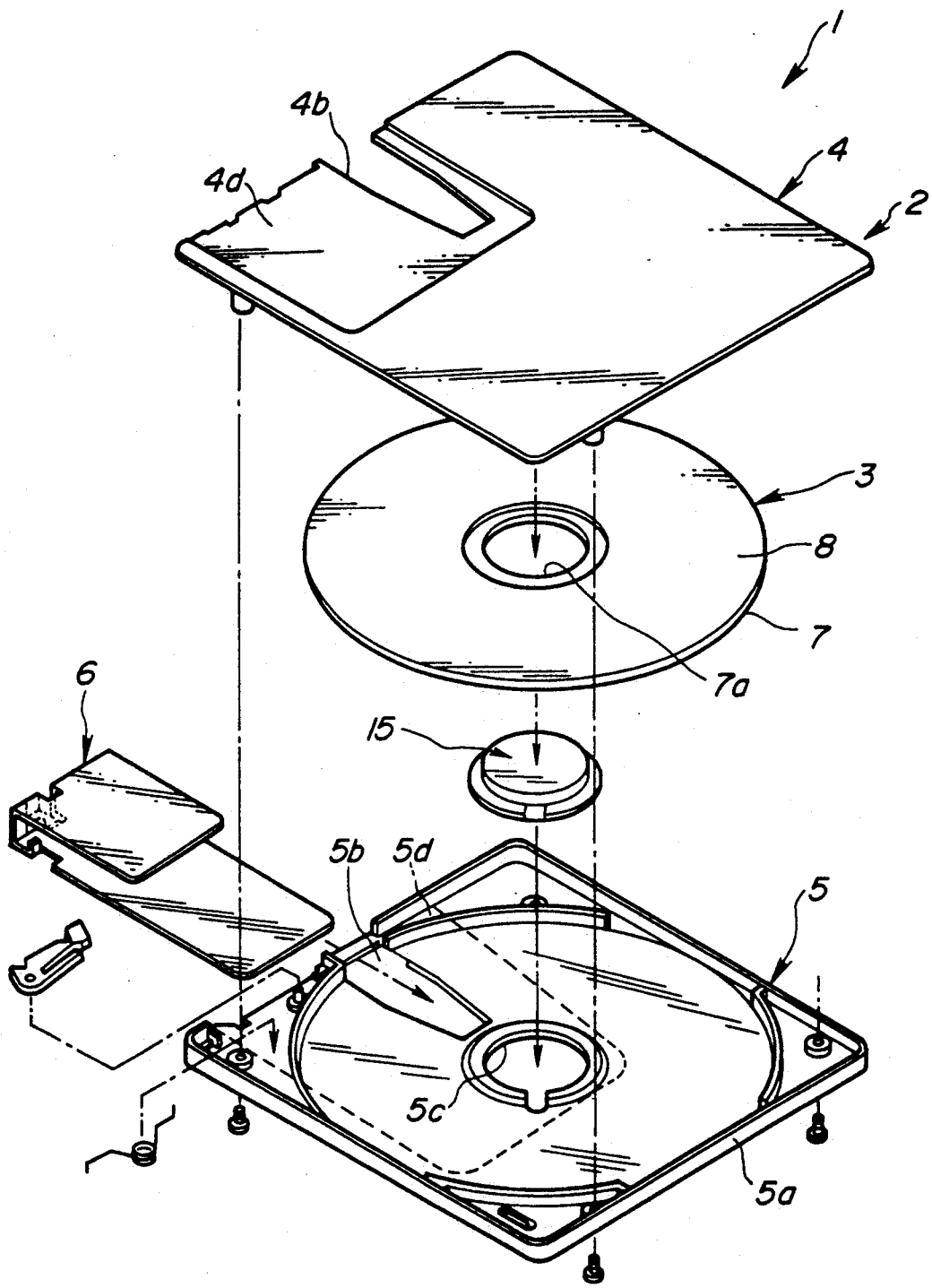
FIG. 3 is an exploded perspective view of the disk cartridge of FIG. 1.

Referring now to the drawings, particularly to FIGS. 1 and 3, the preferred embodiment of a disk 3 is housed within a resin disk cartridge casing 2 of essentially square or rectangular thin box shaped configuration for forming a disk cartridge 1. Similarly to most of known disk cartridges, the casing 2 is constituted of an upper casing 4 and a lower casings. A side wall 5a extends from the peripheral edge of the lower casing 5 in perpendicular relation to the surface of the lower casing. The top edge of the side wall 5a mates with the peripheral portion of the upper casing 4. The upper and lower casings 4 and 5 are formed with disk access windows 4b and 5b for accessing the disk 3 therethrough. The lower casing 5 also has a center opening 5c to receive therethrough a spindle for rotatingly driving the disk 3. The center opening 5c and the disk access windows 4b and 5b are openably closed by a shutter 6. The shutter 6 is made of a metal and formed into essentially channel shaped configuration. The shutter 6 is slidingly attached on the disk cartridge for sliding within shutter receptacle rest 4d and 5d.

The disk 3 has an essentially disk shaped or thin dish shaped disk base 7 defining a center opening 7a, a hub member 15 received within the center opening, and a pair of recording medium sheets 8 attached on both side surfaces of the disk base 7. The disk base 7 is formed of a relatively hard material, such as polyamide resin to which is added aluminum alloy reinforcement material or so forth. The hub 15 defines a center spindle receptacle boss 15a. The disk 3 defines annular grooves 10 extending around the center opening. Along the inner and outer peripheries of the annular grooves 10, a pair of lands 9 are formed. The inner land 9 is provided with an inner installation surfaces 9a helping to define the plane in which to dispose the recording medium sheets 8. Similarly, the outer land 9 is provided with an outer installation surface 9b helping to define the plane to install the recording medium sheet 8. The inner and outer installation surfaces 9a and 9b cooperate to define a plane for installing the recording medium sheet 8. An inner annular surface 11a oriented between the inner installation surface 9a and the center opening 7a, is tapered for forming an inner bonding surface to bond the inner end portion thereonto. On the other hand, an outer annular surface 11b is defined radially outside of the outer installation surface 9b to form an outer bonding surface. Bond or adhesive is applied on the bonding surfaces 11a and 11b for bonding or fixedly securing the outer circumferential portion of the recording medium sheet thereon.

Between the intersection between the installation surface 9b and the bonding surface 11b, an essentially V-shaped groove 12 is formed. The V-shaped groove 12 extends along the overall length of intersection between the installation surface 9b and the bonding surface. The outer edge 12a of the groove 12 is common to the inner circumferential edge of the bonding surface and positioned below the plane (technically a cone frustum) defined by the outer perioheral edge 9b' of the installation surface 9b and the outer peripheral edge of 11b' of the outer bonding surface 11b, on which place the outer peripheral portion of the recording medium sheet 3 lies. As a result, the plan extending between the outer peripheral edge 11b' of the bonding surface and the outer higher edge 12a of the V-shaped groove 12, on which the outer bonding surface is formed, is oblique to the plane of the circumferential portion of the recording medium sheet 8 and intersects it at the outer peripheral edge 11b'. Therefore, a cross sectionally triangular clearance 14 is formed between the recording medium sheet 8 and the outer bonding surface 11b. A similar construction of the V-shaped groove 12 is formed at the intersection between the bonding surface 11a and the installation surface 9a. Therefore, similarly to the outer peripheral portion, the clearance 14 is defined between the recording medium sheet 8 and the bonding surface 11a.

Upon installation of the recording medium sheet 8 on the disk base 7 in manufacture, the recording medium sheet 8 is held by a sheet holding device which can apply a tension force on the recording medium sheet of a predetermined magnitude. The sheet holding device carries the recording medium sheet on one side or both sides of the disk base 7. Then, the recording medium sheet 8 is stretched between the inner and outer installation surfaces 9a and 9b with a predetermined magnitude of radial tension exerted radially outward. At this condition, the inner and outer circumferential portions of the recording medium sheet 8 are bonded by the bond stored in the clearances 14 formed on the inner and outer bonding surfaces 11a and 11b.

During the bonding process set forth above, the radially outward tension force is exerted on the recording medium sheet 8. The radially outward tension force leads to a slipping movement of the recording medium sheet 8 relative to the installation surfaces 9a and 9b and the bonding surfaces 11a and 11b. However, since the clearances 14 are formed between the recording medium sheet and the bonding surfaces, the necessary amount of bond for firmly fixing the peripheral portions of the recording medium sheet onto the bonding surface can be maintained. Furthermore, with the shown construction, the amount of bond to be scraped by the slipping movement of the recording medium sheet can be maintained small to successfully prevent the scraped bond from being accumulated and solidified at the outside of the peripheral edge of the disk base 7. The solidified block would otherwise cause difficulty in cutting off or removal of the extra portion of the recording medium sheet extending from the outer periphery of the disk base.

Figure 4:
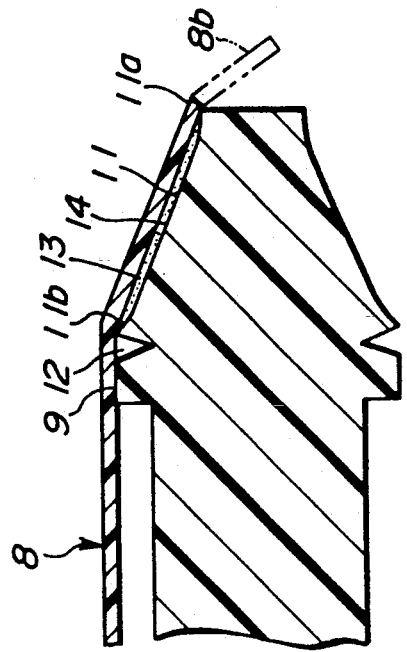
FIG. 4 is an enlarged section showing the major part of the invention.
Figure 2:
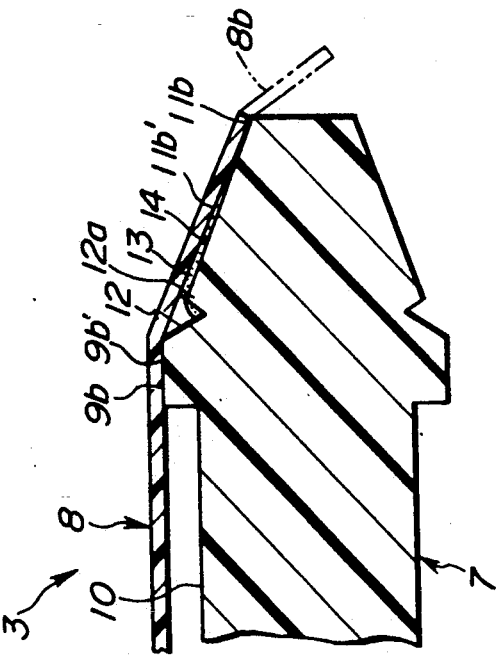
FIG. 2 is an enlarged cross section of the major part of the preferred embodiment of the disk of FIG. 1.

FIG. 4 shows a modification of the foregoing preferred embodiment of the present invention. In contrast to the foregoing embodiment, the shown embodiment provides a thin groove 12 on the bonding surfaces 11a (not shown in FIG. 4) and 11b. The thin groove 12 extends substantially over all the area of the second bonding surface while leaving narrow lands 11a and 11b along the inner and outer peripheries of the bonding surfaces. Furthermore, in contrast to the foregoing embodiment, the outer higher edge of the V-shaped groove 12 is oriented in alignment or in flush with the associated installation surfaces.

With the shown construction, the groove 15 serves for defining the clearance 14 for maintaining the necessary amount of bond.

The shown construction may thus provide a similar effect to the foregoing embodiment and thus achieves advantages sought for the present invention.

While the present invention has been discussed hereabove in terms of the preferred embodiments of the present invention, the invention can be embodied in any ways. Therefore, the invention has to be interpreted to incorporate all possible embodiments and modifications thereof which can be implemented without departing from the principle of the invention.

What is claimed is:

1. A disk comprising:

a recording medium sheet;

a disk base having a center portion including a center hub and a circumferential portion extending substantially along the outer periphery of said disk base, at least one of said center portion and said circumferential portion defining an installation surface lying in a first plane in which said recording medium sheet lies and a bonding surface to which a corresponding portion of said recording medium sheet is bonded with a predetermined magnitude of radial tension, said bonding surface being contoured so that it forms a clearance with the corresponding portion of said recording medium sheet, and said clearance being substantially coextensive with both said bonding surface and said corresponding portion of said recording medium sheet.

2. A disk set forth in claim 1 wherein said clearance is formed by displacing one side edge of said bonding surface away from said corresponding portion of said recording medium sheet.

3. A disk as set forth in claim 1 wherein said clearance is formed by a groove in said bonding surface.

* * * * *